W. J. FIEGEL.
MOLDING MACHINE.
APPLICATION FILED MAY 13, 1918.
1,314,954.
Patented Sept. 2, 1919.
3 SHEETS—SHEET 1.
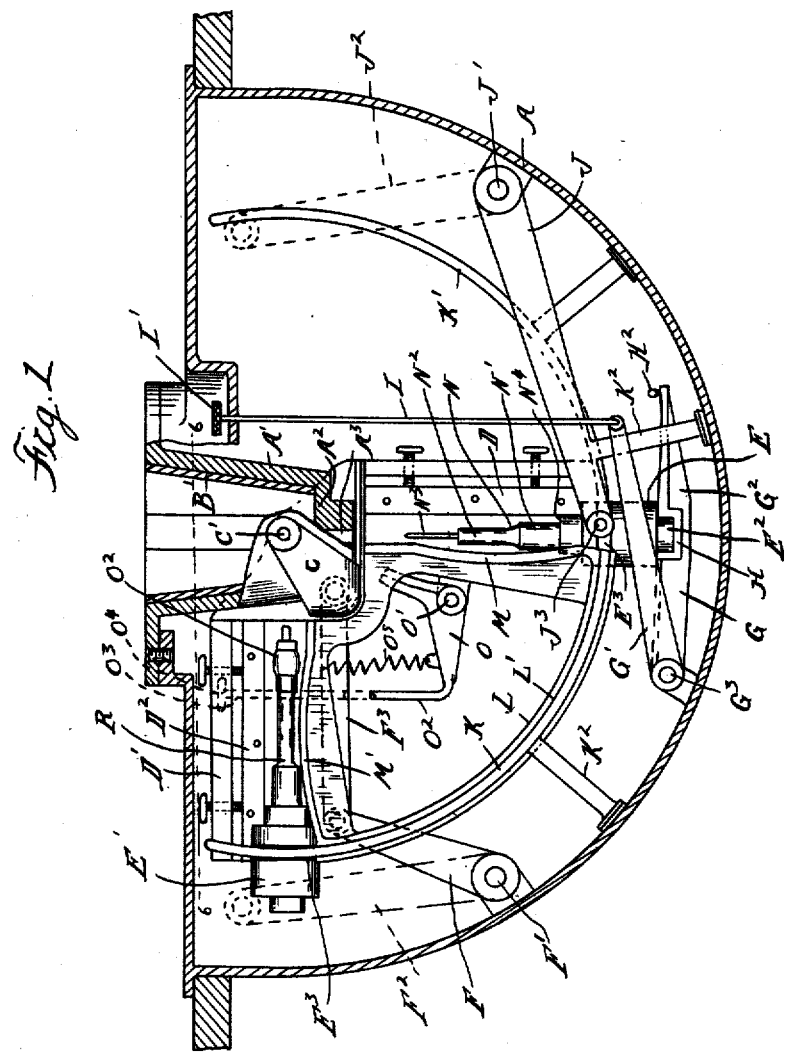
Inventor
William J. Fiegel
By Whittemore Hulbert & Whittemore.
Attorneys

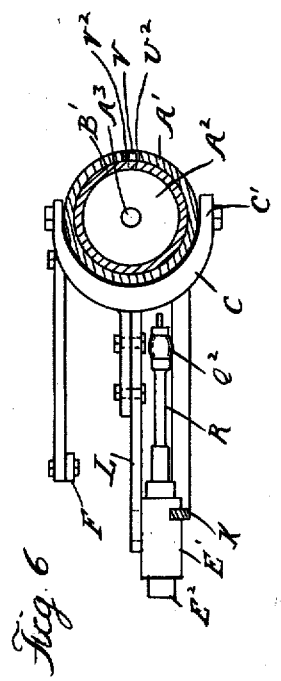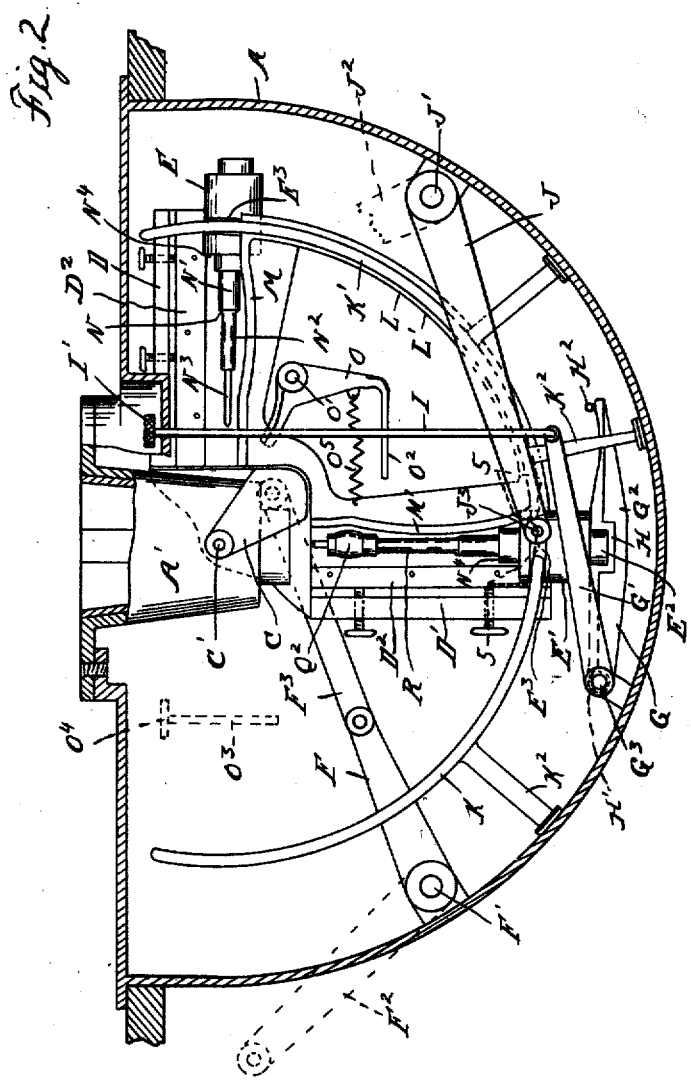

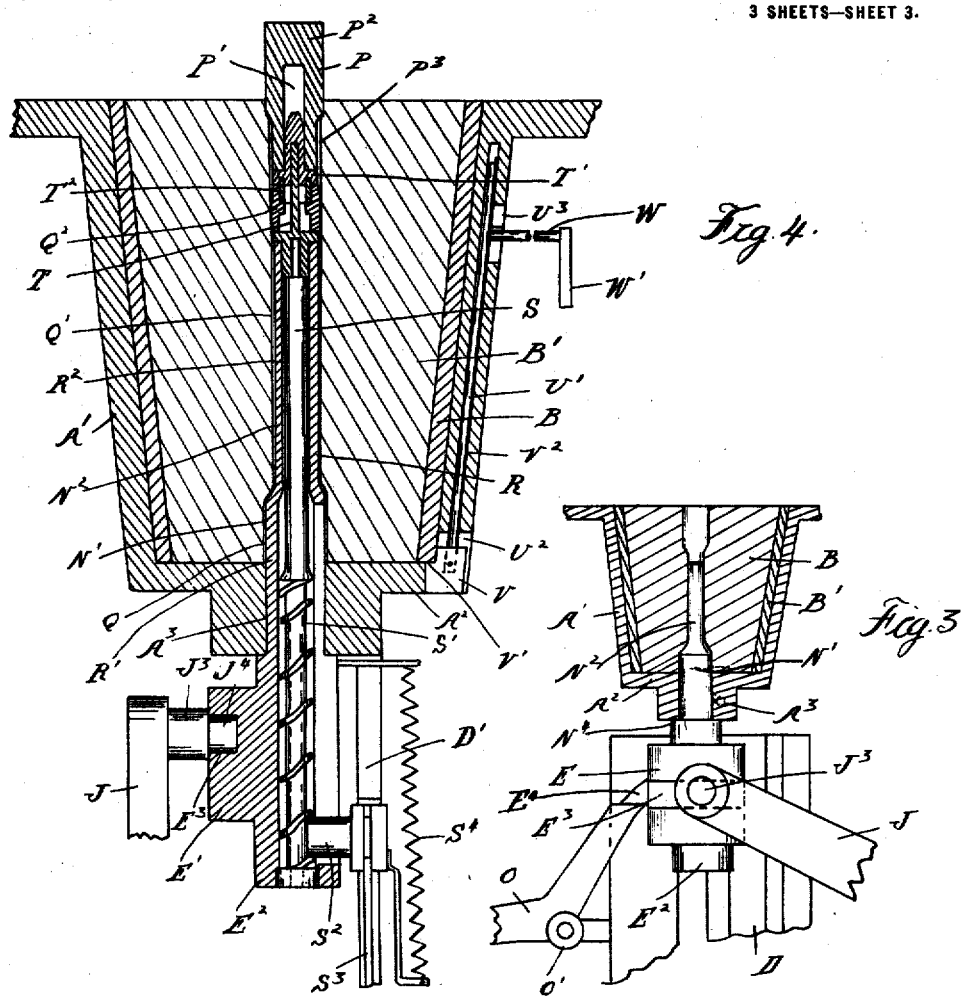
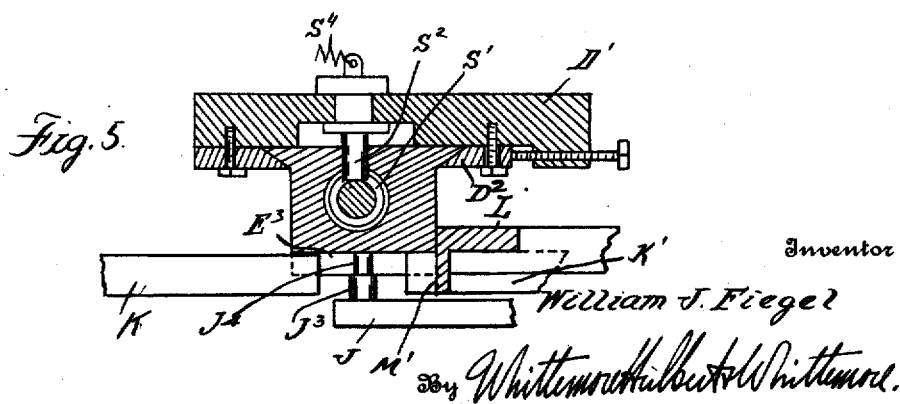

UNITED STATES PATENT OFFICE.

WILLIAM J. FIEGEL, OF DETROIT, MICHIGAN, ASSIGNOR TO GENERAL ALUMINUM & BRASS MFG. COMPANY, OF DETROIT, MICHIGAN, A CORPORATION OF MICHIGAN.

MOLDING-MACHINE.

1,314,954.      Specification of Letters Patent.      Patented Sept. 2, 1919.

Application filed May 13, 1918. Serial No. 234,246.

*To all whom it may concern:*

Be it known that I, WILLIAM J. FIEGEL, a citizen of the United States of America, residing at Detroit, in the county of Wayne and State of Michigan, have invented certain new and useful Improvements in Molding-Machines, of which the following is a specification, reference being had therein to the accompanying drawings.

The invention relates to molding machines of that type adapted especially for use in forming one-part molds for test bars. It is necessary to secure test-bars having a portion intermediate its ends of constant cross-sectional area and it is highly desirable to secure a casting having this construction without the necessity of performing a machining operation. One of the objects of the invention is to obtain a construction for forming a cavity in a one-part mold having a portion throughout its length of constant cross-sectional area. Another object is to obtain a construction in which there is a pattern and a slick both of which are adapted to alternatively register in the same position and when in this position, are adapted to be moved by the same member. A further object is to provide means for preventing the rotating of the member carrying the pattern and slick when the pattern or slick are in various positions of adjustment and also for preventing movement of the arm for adjusting the pattern and slick when the member carrying the same is being rotated. A still further object is to provide means for guiding the slides upon which the pattern and slick are mounted, while their carrying member is being rotated. Other objects of the invention reside in other advantages and further in the novel arrangements and combinations of parts as more fully hereinafter set forth.

In the drawings:

Figure 1 is a sectional side elevation of a molding machine embodying my invention;

Fig. 2 is a similar view showing the segmental arm carrying the pattern and slick in its adjusted position;

Fig. 3 is a longitudinally central view of the mold with the pattern therewithin;

Fig. 4 is a similar view with the slick therewithin;

Fig. 5 is a sectional view on the line 5—5 of Fig. 2;

Fig. 6 is a similar view on the line 6—6 of Fig. 1.

A is the housing of the molding machine, preferably of segmental shape and having a front plate (not shown) removably secured thereto, permitting of the insertion of the mechanism. Mounted centrally of the top of the housing and secured thereto is the depending casing A' extending in to the housing. This casing is conical-shaped and open at its upper end for receiving the mold B and its conical-shaped shell B' slidably engageable with the casing. The base $A^2$ of the casing has the centrally located aperture $A^3$ therein, through which tools, hereinafter described, are adapted to pass. Embracing the casing A' is the bifurcated arm C pivoted thereto on opposite sides at C'. The radially extending arms D and D' are fixedly secured to the bifurcated arm C, preferably at right angles to each other and have the adjustable parallel bearings $D^2$ slidably engaged by the slide blocks E and E' respectively.

F is a rock arm pivoted to the side of the housing A at F' and non-rotatably secured to the hand lever $F^2$ outside of the housing (shown in dotted lines). $F^3$ is a link pivotally connecting the rock arm F to the bifurcated arm C. To axially aline the slide blocks E and E' with the casing A' so that the tools carried thereby, hereinafter described, will accurately enter the aperture $A^3$ in the bottom of the casing the yoke G is provided, comprising the levers G' and $G^2$ pivoted to the bottom of the housing A at $G^3$. The lever $G^2$ has the recess H in its upper edge for alternative engagement with the projections $E^2$ upon the outer ends of the slide blocks and is normally forced upward into position to engage the projections by means of the coil spring H'. The stop $H^2$ limits the upward movement of the lever $G^2$. Pivotally connected to the other lever G' of the yoke is the push rod I having the push button I' above the top of the housing A. J is a rock arm pivoted to the opposite side of the housing A at J' and non-rotatably secured to the hand lever $J^2$ outside of the housing (shown in dotted lines). $J^3$ is an inwardly and transversely-extending pin at the end of the rock arm J and moves substantially vertically through an arc upon rotation of the rock-arm J. The slide blocks E and E' have the transverse grooves E³ in their outer surfaces adapted to be engaged by the roller J⁴ upon the pin J³, the arrangement being such that the necessary transverse travel of the roller with respect to the slide blocks is permitted while the roller is moving through its substantially vertically extending arc. For the purpose of maintaining the slide blocks at all times in operative relation so that the grooves E³ therein will positively register with the roller J⁴ when the bifurcated arm C is rotated both the slide blocks and the roller are engaged by guides. In detail, K is a segmental guide secured to the housing A and concentric with the pivot C', this guide adapted to enter the channel E³ in the slide block E'. K' is a corresponding segmental guide secured to the housing A and adapted to enter the channel E³ in the slide block E. These segmental guides have their lower adjacent ends spaced from each other for the roller J⁴. This roller is normally held in registration with the guides K and K' by means of the depending arm K² upon the rock arm J engaging the bottom of the housing A. This roller is also held in registration with the guides K and K' during rotation of the bifurcated arm C by means of the segmental member L secured to the radial arms D and D' and the bifurcated arm C and having the circular channel L' concentric with and engageable with either circular guide K, K'. Upon rotating the segmental member the channel L' engages the roller J⁴ and positively retains the same in place to be engaged with the channel in either block near the end of rotation of the bifurcated arm. The segmental member also reinforces the radial arms D and D'.

With the above construction it is readily seen that the rock-arm J can not be rotated when the rock-arm F is in an intermediate position of adjustment. In order to prevent the rotation of the rock-arm F when the rock-arm J is in any position of adjustment, the segmental member L has the outwardly-extending flanges M and M', each curved to be concentric with the pivot J' of the rock-arm J and adapted to be engaged by the pin J³ of the rock-arm upon rotation of the latter when the slide blocks E and E' are respectively in alinement with the aperture A³ in the casing A'. These flanges M and M' are upon sides of the roller opposite those to which the bifurcated arm would be adjusted.

The tool mounted upon the slide block E is the pattern N having the cylindrical base N', the cylindrical portion N² of reduced diameter and the axial pin N³ of still smaller diameter. The base N' is of slightly smaller diameter than the aperture A³ in the casing A and being alined therewith will not engage and wear the wall of the aperture upon engaging therein. The upward movement of the slide block E is limited by the engagement of the shoulder N⁴ with the bottom A² of the casing.

For retaining the pattern within the casing A' the block E has the lateral lug E⁴ adapted to be engaged in its upper adjusted position by the rock arm O pivoted at O' to the segmental member L and having the portion O² normally in the path of travel of the push-rod O³ with the push button O⁴ above the top of the housing A. The coil spring O⁵ normally tends to swing the rock arm O into engagement with the lateral lug E⁴.

When the pattern is locked within the casing A' the floating slick P, having the axial bore P' for engaging the pin N³, is mounted on the pattern N. This floating slick has the cylindrical base portion P² of the same diameter as the base N', and the cylindrical portion P³ of the same diameter as N². In order to longitudinally withdraw the pattern and floating slick, their different portions have slight tapers. The mold B is formed by putting green sand or other suitable material into the shell B' previously placed in the casing A' and slightly tamping the sand down and leveling off. The pattern and slick are of a combined length such that the top of the slick is flush with the level of the sand. The pattern is then removed longitudinally by moving the slide block E downward and the cavity Q is formed having the intermediate tapering portion Q'.

A very important feature of my invention relates to the following construction for securing uniform cross-sectional area of the tapering portion Q' of the cavity. As shown, the tool mounted upon the slide block E' is the slick Q², which is annular and has rounded opposite ends. This slick is freely mounted upon the stem R in turn secured in the slide block E' and the stem has a base R' and a reduced portion R² corresponding to the base and reduced portions of the pattern but of slightly smaller diameter. The greatest diameter of the slick Q² is equal to the greatest diameter of the tapering portion Q' of the cavity in the mold and is greater than the diameter of the reduced portion R² of the stem.

For the purpose of rotating the slick Q² the following construction is provided: The stem R is hollow and is engaged by the spindle S which has at its lower end the spiral S' engaged by the pin S² mounted in the arm D'. In order to rotate the slick Q² only when in engagement with the walls of the mold cavity Q, the pin S² is held in longitudinal sliding engagement with the slot S³ by means of the coil spring S⁴ connected to the pin and bifurcated arm C. To make the slick Q² self-centering, the stem T extends axially up through the slick and is frictionally engaged at its lower end by the reduced portion R² of the stem R and at its upper end by the stop T'. Located between the stop T' and the upper or inner end of the stem R is the slick Q² which is rotatably connected to the stop T' by the universal joint connection T².

For the purpose of readily removing the floating slick P from the mold B the stop T' is adapted to engage the lower or inner end of the floating slick and to force the latter longitudinally outward a sufficient distance to be grasped by the operator. The outward movement of the stop T' and of course the rotating slick Q² is limited by the shoulder V upon the slide block E' contacting with the bottom A² of the casing A'. Sufficient movement is permitted for the rotating slick to move longitudinally of the reduced portion Q' of the cavity for its complete length, thereby smoothing the joint formed between the pattern and floating slick and making the same of uniform diameter.

In order to remove the complete mold from the casing, the latter is provided with the bore U' extending from the bottom of its side wall to a point near the top thereof. The side wall has the slot U² at its bottom in the plane of the bore U' and extending completely through the wall. The side wall also has the slot U³ in the plane of the bore U' and connecting from the outside of the side wall into the bore. The flange plate V slidably engages the slot U² and has the lateral shoulder V' normally flush with the bottom of the mold B and adjacent to the bottom of the shell B'. The rod V² is provided slidably engaging the bore U' and secured to the flat plate V. This rod is secured to the transversely extending rod W, which extends through the slot U³ and is connected to the hand-lever W' outside the housing A and at the front thereof. The lateral shoulder V' of the flat plate V will engage the bottom of the shell B' upon raising the rod V² by means of the hand-lever W', thereby raising the shell a sufficient distance to be grasped by the operator so that the mold can be removed.

In operation, the parts are normally in the position, as shown in Fig. 1, in which the pattern N is in axial alinement with the casing A' for receiving the mold. The pattern is raised by means of rotating the rock-arm J and when within the casing A', is locked in position by means of the rock-arm O engaging the lug E⁴ upon the slide-block E. The floating slick P is then placed upon the pattern, the shell B' placed within the casing A' and green sand or other material tamped into the shell and around the pattern and finally leveled off. The pattern is then removed from the mold B by releasing the rock-arm O from the lug E⁴ through the push button O⁴ and by returning the rock-arm J to its original position.

The next step comprises the rotating of the arms D and D' carrying the slide blocks for the pattern and slick to the positions as shown in Fig. 2, and is accomplished by first releasing the projection E² upon the lower or outer end upon the slide block E from the lever G² and then rocking the rock arm F connected to the bifurcated arm C carrying these arms D and D'. During rotation, the circular guide K guides the slide block E' and the circular guide K' guides the slide block E. Also the circular channel L' retains the roller J⁴ upon the rock-arm J in registration with the guides K and K' so that the channel E³ in the slide block E' is engaged by the roller J⁴ upon sufficient rocking movement of the bifurcated arm C.

The recess H in the lever G² will yieldably engage the projection E² upon the slide block E' when the latter has been rotated a sufficient distance, thereby alining the slide block E' axially of the casing A'. The slick Q² carried by the slide block E' is then raised into engagement with the tapering wall of the reduced portion Q' of the cavity Q in the mold. This is done by the roller J⁴ engaging the slide block E' to raise the same, which correspondingly raises the pin S² engaging the spiral S' connected to the slick Q² until the pin engages the upper end of the slots S³ in the arm D', when upon further movement of the slide block E' the spiral moves relative to the pin and is thereby rotated. The slick Q² having tapered opposite ends and being connected by a universal joint connection will center itself in passing longitudinally through the reduced portion Q' of the cavity.

When near the outer end of movement of the slide block E', the stop T' engages the floating slick P and forces the same longitudinally outward to be grasped by the operator. The slide block E' is then permitted to resume its lowermost position and the rock-arm J will also resume its original position.

While the rock-arm J is in any of its various positions of adjustment, the pin J³ carrying the roller J⁴ engages either the laterally extending flange M or M' so that the bifurcated arm C, which carries the pattern and the slick, can not be rocked.

The slide block E' is now rotated to its original position by means of rocking the arm F and the mold B is removed from the casing A' by means of swinging the hand-lever W' to raise the rod V² and thereby raise the shell B' through the flat plate V.

What I claim as my invention, is:
1. In a molding machine, the combina- tion with a pattern for forming a cavity in the mold, said cavity having a portion along its length of varying cross-sectional area, of means engageable within said portion for forming the same with a constant cross-sectional area.

2. In a molding machine, the combination with a pattern having a tapering portion for forming a corresponding cavity in the mold, of a rotating slick slidably engageable with the tapering wall of said cavity for its complete length to make the same cylindrical.

3. In a molding machine, the combination with a tapering pattern for forming a corresponding cavity in the mold, of a self-centering slick engageable with the wall of said cavity, and means for moving said slick longitudinally thereof.

4. In a molding machine, the combination with a tapering cylindrical pattern for forming a corresponding cavity in the mold, of an annular self-centering slick engageable with the wall of said cavity, means for moving said slick longitudinally within said cavity and for rotating said slick, and means for rotating said slick while in engagement with the wall of the cavity.

5. In a molding machine, the combination with a tapering cylindrical pattern for forming a corresponding cavity in the mold, of an annular self-centering slick engageable with the wall of said cavity, means for moving said slick longitudinally of said cavity, and means for rotating said slick dependent upon its longitudinal movement.

6. In a molding machine, the combination with a tapering cylindrical pattern for forming a corresponding cavity in the mold, of an annular slick engageable with the wall of said cavity, a stem movable longitudinally within said cavity, a universal joint connection between said stem and annular slick, and means for rotating said stem.

7. In a molding machine, the combination with a pattern and a floating slick for forming a continuous cavity in the mold, of a rotating slick longitudinally engageable with the wall of said cavity, and means for removing said pattern and inserting said rotating slick, and means upon said slick for engaging said floating slick to force the same longitudinally outward.

8. In a molding machine, the combination with a pattern and a slick adapted to alternatively register in the same position, of a common means for moving said pattern and slick when in said position.

9. In a molding machine, the combination with a casing for receiving the mold, of radial arms pivoted to said casing, slide blocks upon said arms, a pattern and a slick respectively upon said slide blocks and longitudinally insertible into said casing, and means for moving said pattern and slick into said casing.

10. In a molding machine, the combination with a casing for receiving the mold, of radial arms pivoted to said casing, slide blocks upon said arms, a pattern and a slick respectively upon said slide blocks and longitudinally insertible into said casing, and a common lever for moving said pattern and slick into said casing.

11. In a molding machine, the combination with a casing for receiving the mold, of a member pivoted to said casing, said member having radially extending arms, slides upon said arms, a pattern and a slick upon the respective slides, means for rotating said member, and means for guiding said slides upon rotation thereof.

12. In a molding machine, the combination with a casing for receiving the mold, of a member embracing said casing and pivoted thereto, said member having radially extending arms, slides upon said arms, a pattern and a slick upon the respective slides, means for rotating said member, means for guiding said slides upon rotation of said member, and a common member for moving said slides longitudinally of said arms and into said casing.

13. In a molding machine, the combination with a casing for receiving the mold, of a shell forming the outer casing for said mold and fitting within said casing, means for forming a cavity in the mold, means for withdrawing said forming means, and means for moving said shell longitudinally outward of said casing.

14. In a molding machine, the combination with a pattern for forming a cavity in the mold, of a slick slidably engageable within said cavity, and means for removing said pattern and moving said slick into alinement with said cavity.

15. In a molding machine, the combination with a pattern for forming a cavity in the mold, of a slick slidably engageable within said cavity, means for moving said slick into alinement with said cavity, means for moving said slick into said cavity, and means permitting of the separate operation of either moving means and preventing the simultaneous operation of both moving means.

16. In a molding machine, the combination with a casing for receiving the mold and a pattern, and a slick insertible into said casing, of means for alternatively inserting said pattern and slick, means for rotating said pattern and slick, and means for preventing the operation of said inserting means during operation of said rotating means and for preventing operation of said rotating means during operation of said inserting means.

17. In a molding machine, the combination with a receptacle for the mold, of a member pivoted thereto, arms upon said member, a pattern and a slick slidably engaging said arms and insertible within said receptacle, a rock-arm for moving said pattern and slick alternatively into said receptacle, means for rotating said pivoted member, and a member secured to said pivoted member and arms for reinforcing the same and provided with means engageable with said rock-arm during its movement upon the side opposite that to which the pivoted member could be rocked.

18. In a molding machine, the combination with a casing for receiving the mold, of a pattern and a slick insertible within said mold, slide-blocks carrying said pattern and slick and adjustable parallel bearings for engaging said slide-blocks.

19. In a molding machine, the combination with a receptacle for the mold, of a pattern longitudinally insertible into said mold, means for moving said pattern thereinto, automatically operating means for retaining said pattern therein, and means for releasing said retaining means.

20. In a molding machine, the combination with a pattern and a floating slick for forming a continuous cavity in the mold, of a slick longitudinally engageable with the wall of said continuous cavity and adapted to smooth the joint in the mold formed by said pattern and floating slick.

21. In a molding machine, the combination with a casing for receiving the mold, of a pattern and a slick alternatively insertible into said casing, of a common means for moving said pattern and slick into said casing.

22. In a molding machine, the combination with a casing for receiving the mold, of a pattern and a slick alternatively insertible into said casing, members carrying said pattern and slick, a member common to said carrying members for moving said pattern and slick into said casing, and guides for said carrying members for retaining the same in operative positions, said member for moving said pattern and slick into said casing normally being located between and in registration with said guides.

WILLIAM J. FIEGEL.

Copies of this patent may be obtained for five cents each, by addressing the "Commissioner of Patents, Washington, D. C."